P. H. MINNIS.
SPRING WHEEL FOR VEHICLES.
APPLICATION FILED MAR. 4, 1911.
1,014,409.
Patented Jan. 9, 1912.
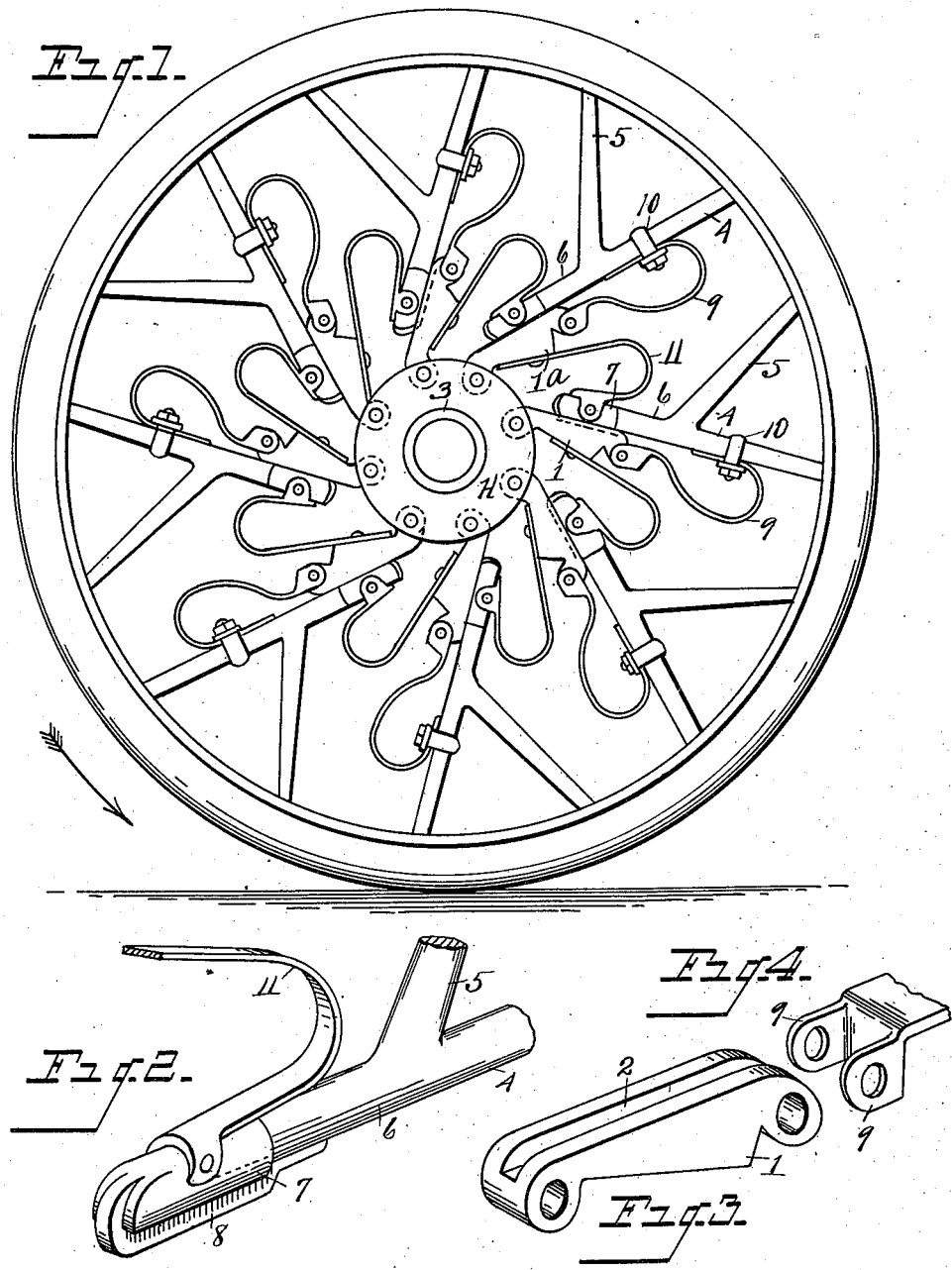

UNITED STATES PATENT OFFICE.

PAUL H. MINNIS, OF LANSING, MICHIGAN.

SPRING-WHEEL FOR VEHICLES.

1,014,409.  Specification of Letters Patent.  Patented Jan. 9, 1912.

Application filed March 4, 1911. Serial No. 612,246.

*To all whom it may concern:*

Be it known that I, PAUL H. MINNIS, a citizen of the United States, residing at Lansing, county of Ingham, State of Michigan, have invented a certain new and useful Improvement in Spring-Wheels for Vehicles, and declare the following to be a full, clear, and exact description of the same, such as will enable others skilled in the art to which it pertains to make and use the same, reference being had to the accompanying drawings, which form a part of this specification.

This invention relates to spring wheels for vehicles; it has for its object an improved spring wheel in which the tension of a number of springs arranged in yielding relation to the fixed spokes of a wheel is utilized.

In the wheel in which this invention is embodied, each member which may be considered as a spoke, consists of several parts of which one part is in fixed relation to the felly, one part is in pivotal relation to the hub, and these two parts are in sliding relation the one to the other and are expanded along their longitudinal axis by a spring connection between the two. The outer part is also connected by spring connection to the pivoted hub part of an adjacent spoke so that in the assembled wheel the pivotal members are held radially spaced by springs which tend to keep them in their proper radial position, but each one of the springs employed for this purpose engages with its companion pivotal part with the end of an outer part of the spoke interposed between the spring and the companion part and the outer part is in sliding relation with the companion part.

In the drawings:—Figure 1, shows a side elevation of a completely assembled wheel. Fig. 2, is a perspective of the engaging end of the outer part of the spoke member. Fig. 3, shows the pivotal part of a spoke member. Fig. 4, shows an end of the spring connection between the pivotal part of the spoke and the fixed part of the spoke.

The hub H has secured to it pivotally a number of pivotal parts 1, each of which, on that side of it which is intended to be in advance in the traveling wheel, on the upward travel is provided with a groove 2 which groove extends along the face that lies in substantially radial relation; the relation, however is not strictly radial but is so arranged that it lies in a plane that is about tangent to the axle bearing 3; in operation, it does not maintain this tangent relation strictly but moves or vibrates to an amount which is dependent upon the obstruction that is met and the weight that is carried. From the felly there extend inward a number of spoke parts, each of which comprises a body 4 and a brace 5 with the body extending in substantially parallel relation with the pivoted part 1 heretofore described. On the inner terminal 6 of the inward projecting part of the spoke is a thimble 7 that has on one side of it a longitudinal tongue 8 that engages in the groove 2 and is adapted to reciprocate therein and to rock therein slightly. A curved spring extends from the end of the thimble 7 to the adjacent pivoted part 1ª, the adjacent pivoted part in this instance being the one to the right as the wheel normally revolves with a left hand motion (of course the term right and left when used in this connection, must be understood with reference to the view of the wheel that is presented herein).

To the end of the pivoted member 1 is pivotally secured a curved spring 9 which makes nearly a full curve, the outer end of it coming back to a direction parallel with the fixed part of that spoke that is connected most directly to the pivoted part 1 and this returned end of the spring is held to the fixed part 4 of the spoke by a clevis or clamp coupling 10 and the spring thus arranged tends to hold the felly away from the hub. A complete circle of such pivotal parts, fixed parts and spring connections are employed to make a complete circuit of the wheel, the number employed is not material, provided each part pivoted to the hub has its complementary part fixed to the felly with which it is in sliding relation and to which it is connected by the distending spring, and each fixed part is in connection with an adjacent pivotal part by a spring which tends to preserve the radial relation of the pivotal parts.

What I claim is:—

1. In a wheel, in combination with a hub, a felly, a plurality of spoke parts pivotally secured to the hub, fixed spoke parts equal in number secured to the felly, sliding connections between each pivotal part and its complementary fixed part, distending springs between each pivotal part and its complementary fixed part, and spacing springs between each fixed part and the adjacent pivotal part, substantially as described.

2. In a wheel, the combination of a felly, a hub, spokes connecting the hub with the felly, each spoke divided into an outer spoke portion attached to the felly and an inner spoke portion attached to the hub, resilient means slidably connecting each inner spoke portion to the companion outer spoke portion, and further resilient means connecting each inner spoke portion pivotally with the outer spoke portion next on one side of the companion outer spoke portion, substantially as described.

3. In a wheel, the combination of a felly, a hub, spokes connecting the hub with the felly, each spoke divided into an outer spoke portion attached to the felly and an inner spoke portion pivotally attached to the hub, a double spring connecting each inner spoke portion slidably with the companion outer spoke portion, and a second double spring connecting each inner spoke portion pivotally with the outer spoke portion next on one side of the companion outer spoke portion, substantially as described.

4. In a wheel, the combination of a felly, a hub, spokes connecting the hub with the felly, each spoke divided into an outer spoke portion attached to the felly and an inner spoke portion attached to the hub, the said inner spoke portion and the said companion outer spoke portion having a groove and tongue slidable connection, a double spring pivoted to the inner spoke portion and fixed to the outer spoke portion, a second double spring attached to the inner spoke portion and pivoted to the outer spoke portion next adjacent on one side of the companion outer spoke portion, substantially as described.

5. In a wheel, the combination of a felly, a hub, spokes connecting the hub and the felly, each spoke divided into an outer spoke portion comprising a body which is normally tangential with the hub and a brace connecting the body with the felly an inner spoke portion attached to the hub, resilient means connecting the outer spoke portions with the inner spoke portions and a second resilient means connecting the outer spoke portions with the inner spoke portions, the said two means coöperating to afford resilient support to the felly at all points about the periphery of the hub, substantially as described.

6. In a wheel, the combination of a felly, a hub, spokes connecting the hub with the felly, each spoke divided into an outer spoke portion fast to the felly and an inner spoke portion pivoted to the hub, the said outer spoke portion lying in tangential relation with the periphery of the hub, and having a tongue and groove slidable connection with the companion inner spoke portion, a double spring clamped to the outer spoke portion near the rim and pivoted to the end of the inner spoke portion, and a second double spring fast to the inner spoke portion and pivoted to the end of the outer spoke portion next adjacent the companion outer spoke portion, substantially as described.

In testimony whereof, I sign this specification in the presence of two witnesses.

PAUL H. MINNIS.

Witnesses:
JAMES MATTHEWS,
CHESTER WOOD.

---

Copies of this patent may be obtained for five cents each, by addressing the "Commissioner of Patents. Washington, D. C."